US011038894B2

(12) United States Patent
Beiter et al.

(10) Patent No.: US 11,038,894 B2
(45) Date of Patent: Jun. 15, 2021

(54) PROVIDING SELECTIVE ACCESS TO RESOURCES

(71) Applicant: HEWLETT-PACKARD DEVELOPMENT COMPANY, L.P., Houston, TX (US)

(72) Inventors: Michael B Beiter, Fort Collins, CO (US); Susan J Kordis, Fort Collins, CO (US); Shane I Saunders, Fort Collins, CO (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 558 days.

(21) Appl. No.: 15/542,836

(22) PCT Filed: Apr. 7, 2015

(86) PCT No.: PCT/US2015/024760
§ 371 (c)(1),
(2) Date: Jul. 11, 2017

(87) PCT Pub. No.: WO2016/164000
PCT Pub. Date: Oct. 13, 2016

(65) Prior Publication Data
US 2018/0020005 A1    Jan. 18, 2018

(51) Int. Cl.
*H04L 29/06* (2006.01)
*H04L 9/32* (2006.01)
*H04L 12/911* (2013.01)

(52) U.S. Cl.
CPC .......... *H04L 63/105* (2013.01); *H04L 9/3213* (2013.01); *H04L 63/10* (2013.01); *H04L 47/82* (2013.01); *H04L 63/083* (2013.01)

(58) Field of Classification Search
CPC ...... H04L 63/105; H04L 47/82; H04L 63/083
See application file for complete search history.

(56) References Cited

U.S. PATENT DOCUMENTS 5,982,780 A * 11/1999 Bohm ................. H04L 12/6418
370/450
6,092,196 A * 7/2000 Reiche .................... G06F 21/41
705/52

(Continued)

FOREIGN PATENT DOCUMENTS

CN          1820249 A      8/2006
CN          103067388      4/2013

(Continued)

OTHER PUBLICATIONS

Amir et al "Cascading Permissions Policy Model for Token-Based Access Control in the Web of Things," 2014 International Conference on Future Internet of Things and Cloud, pp. 238-245, IEEE Computer Society (Year: 2014).*

(Continued)

*Primary Examiner* — Luu T Pham
*Assistant Examiner* — James J Wilcox
(74) *Attorney, Agent, or Firm* — HPI Patent Department (57) ABSTRACT

Examples relate to providing selective access to resources. In one example, a computing device may: receive, from a client application, a request to access a first resource server, the request including a client access token; identify a first set of permissions specified by a client topology, the client topology specifying: the first resource server; the first set of permissions for accessing, by the client application, the first resource server; a second resource server; and a second set of permissions for accessing, by the first resource server, the second resource server; provide the client application with a first access token specifying the first set of permissions and the first resource server; receive, from the first resource server, a request to access the second resource server, the request including the first access token; and provide the first (Continued)

resource server with a second access token specifying the second set of permissions.

10 Claims, 4 Drawing Sheets

(56) References Cited

U.S. PATENT DOCUMENTS

| | | | |
|---|---|---|---|
| 6,799,177 B1* | 9/2004 | Fai | H04L 61/1523 |
| 7,010,600 B1* | 3/2006 | Prasad | H04L 63/0815 |
| | | | 709/223 |
| 7,346,930 B1* | 3/2008 | Boydstun | H04L 63/02 |
| | | | 726/29 |
| 7,530,068 B2* | 5/2009 | Clark | G06F 9/5011 |
| | | | 718/100 |
| 8,615,794 B1 | 12/2013 | Tomilson et al. | |
| 8,769,657 B2* | 7/2014 | Zaitsev | G06F 21/34 |
| | | | 726/9 |
| 8,800,009 B1* | 8/2014 | Beda, III | H04L 63/0846 |
| | | | 713/155 |
| 8,910,295 B2* | 12/2014 | Moore | H04L 63/102 |
| | | | 726/26 |
| 2002/0143960 A1* | 10/2002 | Goren | H04L 12/4641 |
| | | | 709/229 |
| 2004/0054791 A1* | 3/2004 | Chakraborty | H04L 63/20 |
| | | | 709/229 |
| 2005/0125677 A1* | 6/2005 | Michaelides | H04L 9/3234 |
| | | | 713/185 |
| 2008/0178284 A1* | 7/2008 | Harwell | G06F 21/10 |
| | | | 726/21 |
| 2010/0138903 A1* | 6/2010 | Medvinsky | G06F 21/10 |
| | | | 726/6 |
| 2010/0242097 A1* | 9/2010 | Hotes | G06F 21/31 |
| | | | 726/4 |
| 2010/0306547 A1* | 12/2010 | Fallows | G06F 21/305 |
| | | | 713/178 |
| 2011/0282943 A1* | 11/2011 | Anderson | G06Q 10/107 |
| | | | 709/204 |
| 2012/0198512 A1* | 8/2012 | Zhou | H04L 63/102 |
| | | | 726/1 |
| 2012/0311672 A1* | 12/2012 | Connor | H04L 63/105 |
| | | | 726/4 |
| 2013/0086645 A1* | 4/2013 | Srinivasan | H04L 63/0815 |
| | | | 726/4 |
| 2013/0139271 A1* | 5/2013 | Arrelid | G06F 21/10 |
| | | | 726/27 |
| 2014/0033279 A1* | 1/2014 | Nimashakavi | H04L 63/0807 |
| | | | 726/4 |
| 2014/0040993 A1* | 2/2014 | Lorenzo | G06F 21/41 |
| | | | 726/4 |
| 2014/0101722 A1* | 4/2014 | Moore | H04L 63/102 |
| | | | 726/4 |
| 2014/0208398 A1* | 7/2014 | Connor | H04L 63/08 |
| | | | 726/4 |
| 2014/0230020 A1* | 8/2014 | Mogaki | H04L 9/3213 |
| | | | 726/4 |
| 2014/0282984 A1* | 9/2014 | Schlesinger | H04L 63/0807 |
| | | | 726/9 |
| 2014/0289839 A1 | 9/2014 | Chen et al. | |
| 2014/0331332 A1* | 11/2014 | Arrelid | G06F 21/62 |
| | | | 726/27 |
| 2015/0089597 A1* | 3/2015 | Srinivasan | H04W 12/06 |
| | | | 726/4 |
| 2015/0135275 A1* | 5/2015 | Matsugashita | H04L 63/104 |
| | | | 726/4 |
| 2015/0200948 A1* | 7/2015 | Cairns | H04L 9/3213 |
| | | | 726/4 |
| 2015/0350186 A1* | 12/2015 | Chan | H04L 63/0807 |
| | | | 726/9 |

FOREIGN PATENT DOCUMENTS

| | | |
|---|---|---|
| CN | 103716326 | 4/2014 |
| CN | 104022875 | 9/2014 |
| TW | 200710673 A | 3/2007 |
| TW | 201008177 A1 | 2/2010 |
| WO | WO-99-60458 A2 | 11/1999 |
| WO | WO-9960458 A2 | 11/1999 |
| WO | WO-2012069263 | 5/2012 |

OTHER PUBLICATIONS

Pranata et al "Managing Enterprise Authentication and Authorization Permissions in Digital Ecosystem," 2009 3rd IEEE International Conference on Digital Ecosystems and Technologies, pp. 279-284. (Year: 2009).*

Ahmad, A. et al., "A. Multi-Token Authorization Strategy for Secure Mobile Cloud Computing," 2014 2nd IEEE International Conference on, IEEE, Apr. 11, 2014, 6 pages.

Bhola, P.A.S, et al., "Secure Delegation for Web 2.0 and Mashups," 2008 Workshop on Web 2.0 Security and Privacy, 2008.

D. Mitton et al, "Network Access Server Requirements Next Generation (NASREQNG) NAS Model" Jul. 2000.

Microsoft: e [MS-SFU]: Kerberos Protocol Extensions: Service for User and Constrained Delegation Protocol Specification—v. 14.8.

Neuman et al; The Kerberos Network Authentication Service (V5); Geneva, Switzerland, Jul. 1, 2005.

May 14, 2814; URL:https://winprotocoldoc.blob. core.windows.net/productionwindowsarchives/MS-SFU/[M S-SFUj-148515.pdf.

* cited by examiner

PROVIDING SELECTIVE ACCESS TO RESOURCES

BACKGROUND

Computing services and applications increasingly seek access to resources that are owned and/or managed by other services and applications. For example, a web application running on a website may seek a user's permission to post content from the website onto the user's blog, which may be a resource managed by a separate entity. After obtaining permission to post on the user's behalf, the entity that manages the user's blog may allow the web application to post content on the user's blog.

BRIEF DESCRIPTION OF THE DRAWINGS

The following detailed description references the drawings, wherein.

DETAILED DESCRIPTION

Resource and service providers often delegate various tasks to other resource and service providers. For example, a social media website may make use of a data storage service to provide dynamic storage based on the social media website's needs, and may use an advertisement provider to provide advertisements to social media website users. These services of services, or cascaded services, may often be managed by a third party that specializes in providing a particular service. In situations where a user allows a client service or application to access the user's resources managed by a particular resource provider, e.g., a situation where the user permits a website to post to the user's blog, the permissions granted to the cascaded services of the particular resource provider may be controlled in a manner designed to ensure that cascaded services and resource providers are only provided with the permissions needed to perform their particular task.

In general, for a client service or application to access a user's resources managed by a separate resource server, the user grants the client access by communicating with an authorization server associated with the resource server. The authorization server, upon receiving authentication from the user and, in some implementations, also from the client—such as a user name and password, a client ID, and/or a secret—issues the client a token that allows the client to request access to the user's resources on the resource server, as authorized by the user. The token provided to the client application identifies the client application and generally grants no permissions. To interact with the resource server, the client application may exchange the token for a second token that specifies the resource server and the scope of permissions granted to the client application with respect to the resource server. The scope of the permissions granted to the client application may vary, e.g., depending upon what access the user determined to provide the client application. For example, a user may grant a web application permission to post content on the user's blog, but not permission to modify the user's profile information.

For the resource server to perform various actions, e.g., to post an article on the user's blog, the resource server may need to communicate with one or more cascaded services. For example, to ensure that content posted on a user's blog doesn't violate the resource provider's terms of service or other content restrictions, the resource provider may use, as a cascaded service, a content verification service that verifies the content provided by the client application, e.g., the content verification service may attempt to ensure the content doesn't violate any copyrights or restrictions on content deemed inappropriate by the resource server. Another example cascaded service may be used to render the content in a particular format, for instance, as specified in the user's profile.

To ensure that cascaded services are only provided with the permissions needed to perform their task or tasks, the resource server does not provide the cascaded service with the token provided by the client application. The resource server may, instead, provide its token to the authorization server with a request to access the cascaded service. The authorization server may provide the resource server with a token specific to the cascaded service, and this token may have permissions that are of a different scope than the permissions specified by the token given to the resource server. For example, a content rendering service may not need a token that includes permissions to post on a user's blog and may only need permissions to read the format of the blog from the user's profile to appropriately render the content to be posted by the resource server.

The permissions to be granted by a token between any services associated with the resource server are specified in a client application topology accessible to the authorization server. The authorization server may use the topology to determine which permissions are to be granted by tokens issued to requesting services. Further details regarding the manner in which an authorization server, client, and resource providers interact to selectively delegate access to resources are provided in the paragraphs that follow.

Figure 1:
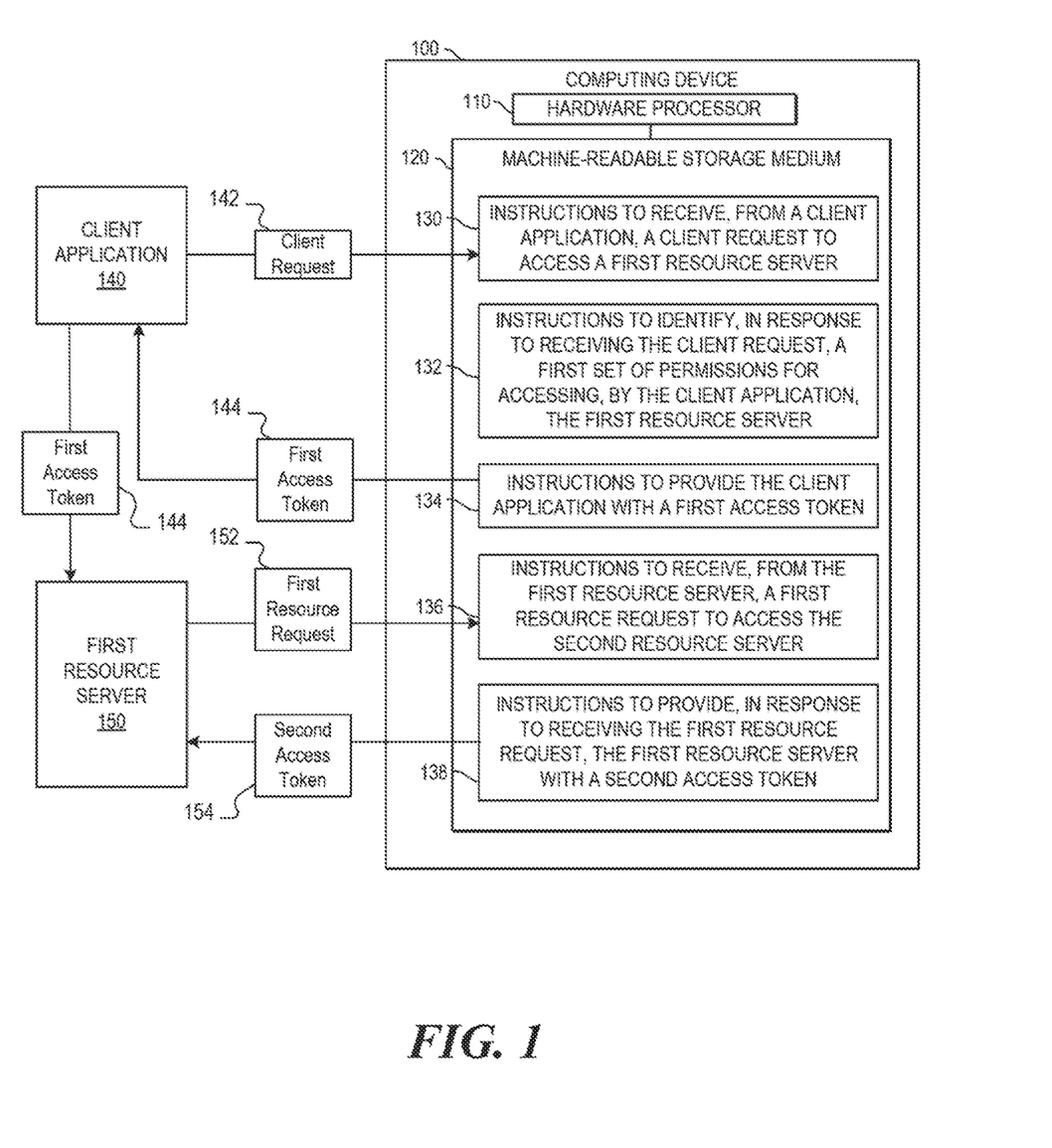
FIG. 1 is a block diagram of an example computing device for providing selective access to resources.

Referring now to the drawings, FIG. 1 is a block diagram of an example computing device 100 for selectively delegating access to resources. Computing device 100 may be, for example, a server computer, a personal computer, a mobile computing device, or any other electronic device suitable for processing data. In the embodiment of FIG. 1, computing device 100 includes hardware processor 110 and machine-readable storage medium 120.

Hardware processor 110 may be one or more central processing units (CPUs), semiconductor-based microprocessors, and/or other hardware devices suitable for retrieval and execution of instructions stored in machine-readable storage medium 120. Hardware processor 110 may fetch, decode, and execute instructions, such as 130-138, to control the process for selectively delegating access to resources. As an alternative or in addition to retrieving and executing instructions, hardware processor 110 may include one or more electronic circuits that include electronic components for performing the functionality of one or more of instructions.

A machine-readable storage medium, such as 120, may be any electronic, magnetic, optical, or other physical storage device that contains or stores executable instructions. Thus, machine-readable storage medium 120 may be, for example, Random Access Memory (RAM), an Electrically Erasable Programmable Read-Only Memory (EEPROM), a storage device, an optical disc, and the like. In some implementations, storage medium 120 may be a non-transitory storage medium, where the term "non-transitory" does not encompass transitory propagating signals. As described in detail below, machine-readable storage medium 120 may be encoded with a series of executable instructions: 130-138, for selectively delegating access to resources.

As shown in FIG. 1, the computing device 100 executes instructions to receive, from a client application 140, a client request 142 to access a first resource server 150 (130). The client request 142 includes an access token specifying the client application 140 as the audience, e.g., the intended recipient. In some implementations, the access token may have been previously provided to the client application 140 by the computing device 100. For example, the access token may have been provided to the client application 140 as the result of an authorization process where a user authorized the client application 140 to access a protected resource on the user's behalf. The access token alone, in some implementations, grants no permissions to access resources, e.g., it must be exchanged for the client application 140 to access a particular protected resource.

The computing device 100 executes instructions to identify, in response to receiving the client request 142, a first set of permissions for accessing, by the client application 140, the first resource server 150(132). The first set of permissions may be specified by a topology for the client application 140. The topology may specify, for example: the first resource server 150 and the first set of permissions for accessing the first resource server 150 by the client application 140; and a second resource server with a second set of permissions for accessing the second resource server by the first resource server 150.

By way of example, the client application 140 may be a news feed application running on a user's mobile device, and the first resource server 150 may be the host of a blog managed by the user. In this example, the topology for the news feed application specifies the blog host and a first set of permissions granted to the news feed application on the user's behalf. For example, the user may have previously authorized the news feed application to post news stories to the user's blog, e.g., upon the user's interaction with a news article presented within the news feed application. In this example, the topology for the news feed application also specifies a cascaded service, such as a rendering service for formatting a news article being posted to the user's blog, and a set of permissions for the blog host to interact with the cascaded service. A rendering service may have permission to access the user's profile information, such as the user's blog layout, to perform the rendering service, but may not have permission to post anything to the user's blog. As the rendering service may be managed by a third party—outside of the control of the blog host—limiting the permissions granted to cascaded services may prevent unauthorized and/or un-intended access to the user's protected resources.

In some implementations, the computing device 100 may receive the topology from the client application 140. For example, a developer of the client application 140 may generate a topology based on data obtained from the first resource server 150 and its associated resource servers and services, cascaded or otherwise.

In some implementations, the computing device 100 may generate the topology for the client application 140 using sub-topologies received from the client application 140 and/or the first resource server 150. For example, rather than relying on the developer of the client application 140 to know the topology of the first resource server, including all of the associated resource servers and permissions, the developer of the client application 140 may provide a sub-topology specifying the permissions associated with the direct interactions of the client application 140 with the resources associated with the first resource server 150 which, in this example, is only the first resource server 150. The first resource server 150 may provide a sub-topology specifying the permissions associated with the direct interactions of the first resource server 150 and, in some implementations, any cascaded resource servers and services associated with the first resource server 150. Using the sub-topologies provided by the client application 140 and the first resource server 150, the computing device 100 may generate the entire topology specifying the permissions of interactions between the client application 140, the first resource server 150, and resource servers and services associated with the first resource server 150.

The computing device 100 executes instructions to provide the client application 140 with a first access token 144 (134). The first access token 144 specifies the first set of permissions and, as an audience, the first resource server 150. For example, as specified by the example topology, the news feed application may be provided with an access token that specifies the bog host as the audience and the permission to post to the user's blog in the first set of permissions.

In the example environment depicted in FIG. 1, the client application 140 is depicted as communicating with the first resource server 150 using the first access token 144. The communications may include, for example, a communication that includes the news feed application's news article or a link to the article, a request to post the news article on the user's blog, and the token indicating that the news feed application has been authorized to post to the user's blog.

The computing device 100 executes instructions to receive, from the first resource server 150, a first resource request 152 to access the second resource server (136). For example, upon receipt of the first access token 144 and data indicating that the news feed application has a news article and authorization to post the news article on the user's blog, the blog host may need to communicate with a rendering service to format the news article in a manner that meets the design standards of the blog host and/or the user's blog layout. The first access token 144 does not specify the second resource server. e.g., the rendering service, as an audience, and may not include the necessary permissions, e.g., access to user's blog layout; accordingly, in this example, the first resource server 150 sends the first resource request 152 for the proper token to communicate with and make use of the second resource server.

The computing device 100 executes instructions to provide, in response to receiving the first resource request 152, the first resource server 150 with a second access token 154 (138). The second access token 154 specifies the second set of permissions and, as a second audience, the second resource server. As with the first access token 144, the second access token 154 may be provided to the first resource server 150 based on the client application topology. Using the example provided above, the second access token 154 may specify the rendering service as the audience and the permissions may include access to the user's blog layout.

As discussed above, the permissions provided by any given token may vary. Resource servers, cascaded or otherwise, may have any combination of permissions as specified in the topology for a given client application. While the example described with reference to FIG. 1 includes a single resource server and a single cascaded service, many other resource servers—which may include cascaded services—may be included in a topology. In addition, a variety of configurations are possible for communications between resource servers, cascaded or otherwise, e.g., cascaded servers may also use cascaded services, and permissions between services may be uni-directional—where the permissions granted by a first service to a second service are different from the permissions granted by the second service to the first service.

Each client application may be associated with multiple topologies. e.g., one topology for each different protected resource to which the client application may access on behalf of a user. For example, the news feed application may have authorization to access the user's second blog on a second blog host, authorization to the user's email contacts to send a news article to one of the users contacts, and/or authorization to the user's advertising content profile to add topics of interest to the user's profile based on the articles in which the user is interested. In addition, each resource server, cascaded or otherwise, may belong to multiple topologies. For example, a third party rendering service may be used by multiple resource servers, and belong to multiple topologies associated with the same client application. As another example, each client application that is authorized to access a resource server may have a topology for the interactions with the resource server, and the topology may be separate from the topologies of other client applications for the same resource server.

Figure 2A:
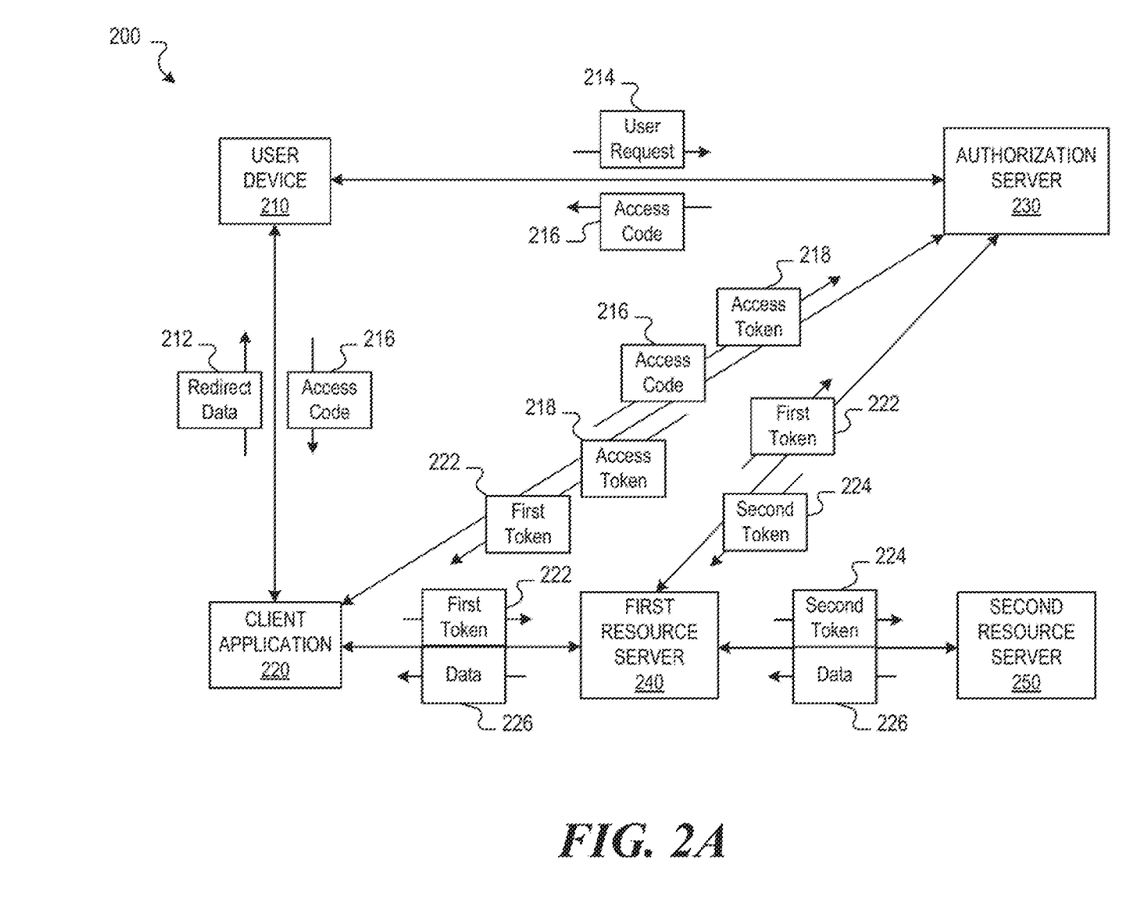
FIG. 2A is an example data flow for providing selective access to resources.
Figure 2B:
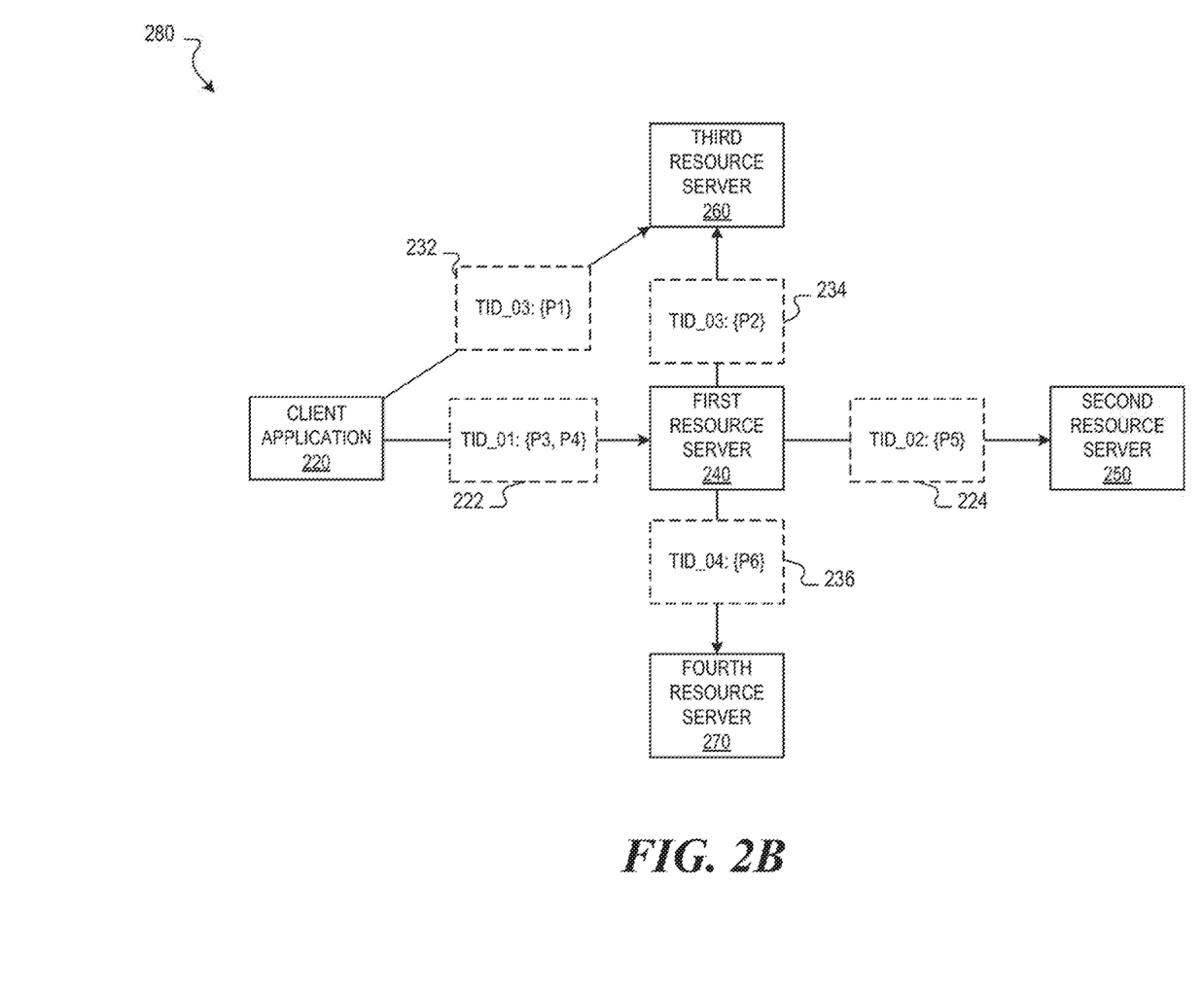
FIG. 2B is an example topology used for providing selective access to resources.

FIG. 2A is an example data flow 200 for providing selecting access to resources, while FIG. 2B is an example topology used for providing selective access to resources. The data flow 200 depicts an authorization server 230, which may be implemented by a computing device, such as the computing device 100 described above with respect to FIG. 1. The user device 210, client application 220, first resource server 240, and second resource server 250 may be implemented by any computing device suitable for processing data, such as a personal computer, mobile computer, or server computer. For example, the user device 210 may be a user's personal computer, the client application 220 may be a web application implemented on a web server, the authorization server 230, first resource server 240, and second resource server 250 may be implemented on one or more server devices, virtual machines, and the like.

The example data flow 200 depicts an example exchange of information that may occur between the depicted devices, e.g., using example topology 280. In general, and as described above, the topology 280 may be generated by the developer of the client application 220, alone or in combination with the entity that manages the first resource server 240. For example, in some implementations, the client topology may be generated based on permissions data received from an entity that manages the first resource server 240, where the permissions data specifies, for each of the resource servers associated with the first resource server, e.g., second 250, third 260, and fourth 270 resource servers, at least one of the other resource servers and, for each of the other resource servers, permissions granted to the other resource server. The topology is generally accessible by the authorization server 230, which may use the topology to distribute tokens for accessing protected resources.

In the example data flow 200, a user of the user device 210 may wish to grant access to the user's protected resources, e.g., associated with the first resource server 240, to a client application 220. By way of example, the first resource server 240 may provide a digital photography management service to which the user of user device 210 is subscribed. The user's photographs, e.g., protected resources, may be managed by the first resource server 240 in conjunction with other resource servers, e.g., providing storage, user profile management and printing services. Access to the photographs may be protected, e.g., by a user name and password. The client application 220, which by way of example may be an image tagging web application running on a web server, may give the user device 210 redirect data 212 that redirects a web browser of the user device 210 to the authorization server 230.

The user device 210 sends a user request 214 to the authorization server 230 requesting that the client application 220 be given access to the user's images managed by the first resource server 240. The authorization server 230 may, in the example given above, require that the user authenticate by providing a user name and password and, once authenticated, provide the user device 210 with an access code 216. The user device 210 provides the access code 216 to the client application 220, which provides the access code 216 and, in some implementations, client authentication credentials, to the authorization server in exchange for the access token 218. The access token 218 is provided by the authorization server 230 to allow the client application to access resources associated with the first resource server 240. In some implementations, the access token 218 does not, by itself, grant access to any individual resources or resource servers.

The client application 220 provides the authorization server 230 with the access token 218 along with a request to access the first resource server 240. The authorization server 230, upon receipt of the request and the access token 218, may identify, in the client application topology 280, a first token 222 that is defined for accessing the first resource server 240. In the example topology 280, the first token 222 is represented by the string, "TID_01: {P3, P4}." This example string indicates the topology, "TID," the audience, "01," which indicates the first resource server 240, and a set two permissions, P3 and P4. The manner in which a token may be presented may vary, and tokens generally specify the audience of the token, permissions indicating what can be accessed at the audience, and—in some implementations—the topology to which the token belongs. Using the image tagging application example, the first token 222 provided to the image tagging application may specify the audience, which may be the first resource server 240, and the set of permissions may specify that the image tagging application may access general images and image attributes.

The client application 220 provides the first token to the first resource server 240 with a request for a particular resource, e.g., an image to which the image tagging application is seeking to tag. In the example data flow 200, the first resource server 240 relies on the second resource server 250 to help fulfill the resource request. For example, to tag an image, an image tagging application may need access to an actual image file, and/or may need permission to store an image file, on a storage device that is managed by the second resource server 250.

To communicate with the second resource server 250 with the proper permissions to access the requested resource, the first resource server provides the first token 222 to the authorization server 230 in exchange for the second token 224. As shown in the example topology 280, the second token 224 is represented by the string, "TID_02: {p5}," Indicating that the first resource server 240 is authorized to access "02" of "TID" with permission, p5. In the image tagging example, the permission may be, for example, file permissions to retrieve and store images.

In the example data flow 200, upon receiving an authorized request, e.g., authorized due to the second token 224, the second resource server 250 provides data 226 representing the requested resource to the first resource server 240, which may then provide the data 226 to the client application 220. In the image tagging application example, the data 226 may be an image file to be analyzed and tagged by the client application, or may be confirmation that an image file stored by the second resource server 250 has changed.

The example topology 280 depicted in FIG. 2B also indicates a third token 232 for granting the client application 220 access to a third resource server 260, a fourth token 234 for granting the first resource server 240 access to the third resource server 260, and a fifth token 236 for granting the first resource 240 access to the fourth resource server 270. The topology 280 also indicates, using arrows, the direction(s) in which tokens provide access. The access granted from one resource server to another may not be the same as the access granted in the reverse direction—if any access in the reverse direction is granted at all. For example, the first resource server 240 may access the third resource server with permission, P2, but no token exists in the topology for providing the third resource server 260 access to the first resource server. Many other topology variations may be used to selectively provide access to various related and cascaded resource servers.

Figure 3:
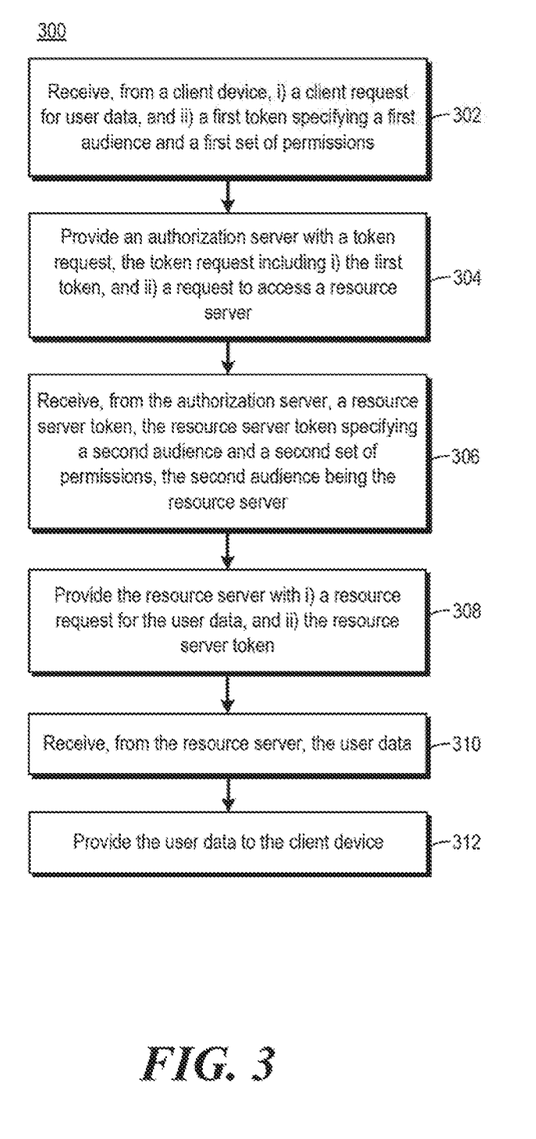
FIG. 3 is a flowchart of an example method for providing selective access to resources.

FIG. 3 is a flowchart of an example method 300 for providing selective access to resources. The method 300 may be performed by a computing device, such as a computing device described in FIG. 1. Other computing devices may also be used to execute method 300, such as a computing device used to implement a resource server. Method 300 may be implemented in the form of executable instructions stored on a machine-readable storage medium, such as the storage medium 120, and/or in the form of electronic circuitry.

A client request for user data and a first token specifying a first audience and a first set of permissions is received from a client device (302). The client device may be, for example, a device implementing a client application to which a user has delegated access, e.g., access to the user's protected resources managed by a first server. The first token and client request may be received by a first server, which manages the user's protected resources.

An authorization server is provided with a token request that includes i) the first token, and ii) a request to access a resource server (304). For example, the first server that manages the user's protected resources may need access to a cascaded resource server, e.g., a resource server to which the first server has delegated some functionality. To access the cascaded resource server, the first server exchanges the first token for a token providing access to the cascaded resource server.

A resource server token is received from the authorization server, the resource server token specifying a second audience and a second set of permissions, the second audience being the resource server (306). For example, the resource server token may specify the cascaded resource server as the audience, and a set of permissions to access the cascaded resource and fulfill the client's request for user data. In some implementations, the set of permissions specified by the resource server token are different from the first set of permissions specified by the first token. For example, the cascaded resource server may require different permissions to perform its service than the permissions required by the first server.

The resource server is provided with i) a resource request for the user data, and ii) the resource server token (308). For example, the resource request for the user data may be similar to the client's request for user data, the resource server token that was received from the authorization server specifies that the requesting server, e.g., the first server, has the permissions to request the user data and that the intended audience for the resource server token is the resource server.

The user data is received from the resource server (310). For example, using the resource server token and the resource request, the resource server is able to provide the first server with the requested user data.

The user data is provided to the client device (312). For example, the first server, upon receiving the requested data, may provide the data to the client device from which the client request originated.

The foregoing disclosure describes a number of example implementations for providing selective access to resources. As detailed above, examples provide a mechanism for using client application and resource server topology to selectively provide access to various resource servers with various permissions and potential applications of a system that is capable of providing selective access to resources.

We claim:

1. A non-transitory machine-readable storage medium encoded with instructions executable by a hardware processor of a computing device for providing selective access to resources, the machine-readable storage medium comprising instructions to cause the hardware processor to:
   receive, from an authorization server, an access token for accessing resources associated with a first resource server;
   provide the authorization server with the access token and a request to access the first resource server;
   receive, from the authorization server, a first token, the first token specifying a first set of permissions for accessing the first resource server and, as a first audience, the first resource server, the first set of permissions being specified by a client topology, the client topology specifying:
      the first resource server;
      the first set of permissions for accessing the first resource server;
      a second resource server; and
      a second set of permissions for accessing, by the first resource server, the second resource server, wherein the second set of permissions includes a permission that is different from the permissions included in the first set of permissions;
   provide the first resource server with a resource request for a resource, the resource request including the first token, wherein the resource request specifies a request for particular user data stored by the second resource server specified by the client topology; and
   generate the client topology based on permissions data received from an entity that manages the first resource server, the permissions data specifying, for each of a plurality of resource servers associated with the first resource server, one other resource server of the plurality of resource servers and, for the one other resource server, permissions granted to the one other resource server.

2. The storage medium of claim 1, wherein the access token grants no permissions.

3. The storage medium of claim 1, wherein the instructions further cause the hardware processor to:
   provide the authorization server with the client topology.

4. The storage medium of claim 1, wherein:
 the second set of permissions is an only set of permissions, specified by the client topology, for accessing the second resource server; and
 the client topology further specifies, as an only source associated with the second set of permissions, the first resource.

5. The storage medium of claim 1, wherein the instructions further cause the hardware processor to:
 receive, from the first resource, the particular user data.

6. A computing device for providing selective access to resources, the computing device comprising:
 a hardware processor; and
 a data storage device storing instructions that, when executed by the hardware processor, cause the hardware processor to:
  receive, from a client application, a client request to access a first resource server, the client request including a client access token specifying, as a client audience, the client application;
  in response to receiving the client request, identify a first set of permissions for accessing, by the client application, the first resource server, the first set of permissions being specified by a client topology for the client application, the client topology specifying:
   the first resource server;
   the first set of permissions for accessing, by the client application, the first resource server;
   a second resource server; and
   a second set of permissions for accessing, by the first resource server, the second resource server, wherein the second set of permissions includes a permission that is different from permissions included in the first set of permissions;
  provide the client application with a first access token, the first access token specifying the first set of permissions and, as a first audience, the first resource server;
  receive, from the first resource server, a first resource request to access the second resource server, the first resource request including the first access token;
  in response to receiving the first resource request, provide the first resource server with a second access token, the second access token specifying the second set of permissions and, as a second audience, the second resource server; and
  generate the client topology based on permissions data received from an entity that manages the first resource server, the permissions data specifying, for each of a plurality of resource servers associated with the first resource server, one other resource server of the plurality of resource servers and, for the one other resource server, permissions granted to the one other resource server.

7. The computing device of claim 6, wherein the instructions further cause the processor to:
 receive, from the client application, the client topology.

8. The computing device of claim 6, wherein the instructions further cause the processor to:
 receive, from the client application, a client sub-topology, the client sub-topology specifying:
  the first resource server; and
  the first set of permissions;
 receive, from the first resource server, a first resource sub-topology, the first resource sub-topology specifying:
  the second resource server; and
  the second set of permissions; and
 generate the client topology using the client sub-topology and the first resource sub-topology.

9. A method for providing selective access to resources, implemented by a hardware processor, the method comprising:
 receiving, from a client device, i) a client request for user data, and ii) a first token specifying a first audience and a first set of permissions;
 providing an authorization server with a token request, the token request including i) the first token, and ii) a request to access a resource server;
 receiving, from the authorization server, a resource server token, the resource server token specifying a second audience and a second set of permissions, the second audience being the resource server, wherein the second set of permissions includes one permission that is different from permissions specified by the first set of permissions;
 providing the resource server with i) a resource request for the user data, and ii) the resource server token;
 receiving, from the resource server, the user data;
 providing the user data to the client device;
 generating a client topology based on permissions data received from an entity that manages the resource server, the permissions data specifying, for each of a plurality of resource servers associated with the resource server, one other resource server of the plurality of resource servers and, for the one other resource server, permissions granted to the one other resource server; and
 providing the authorization server with a resource sub-topology that specifies, for each of the plurality of resource servers, a set of permissions for accessing the resource server, wherein the first set of permissions is specified by the resource sub-topology.

10. The method of claim 9, further comprising:
 providing a resource sub-topology to a client associated with the client device, the resource sub-topology specifying, for each of the plurality of resource servers, one set of permissions for accessing the resource server, and
 wherein the first set of permissions is specified by the resource sub-topology.

* * * * *